United States Patent [19]

Morishita

[11] 4,093,144
[45] June 6, 1978

[54] FISHING REEL BRAKE

[75] Inventor: Yasomatsu Morishita, Kure, Japan

[73] Assignee: Ryobi, Ltd., Fuchu, Japan

[21] Appl. No.: 717,782

[22] Filed: Aug. 25, 1976

[30] Foreign Application Priority Data

Aug. 29, 1975 Japan .................. 50-120020[U]

[51] Int. Cl.² ............................................. A01K 89/02
[52] U.S. Cl. ............................................. 242/84.52 A
[58] Field of Search ................. 242/84.52 A, 84.52 R

[56] References Cited

U.S. PATENT DOCUMENTS

| 2,205,641 | 6/1940 | Wilson | 242/84.52 A |
| 2,374,551 | 4/1945 | Margis, Jr. | 242/84.52 A |
| 2,623,705 | 12/1952 | Whittington | 242/84.52 A |
| 2,658,696 | 11/1953 | Cooper | 242/84.52 A |

FOREIGN PATENT DOCUMENTS

| 447,510 | 5/1936 | United Kingdom | 242/84.52 A |

Primary Examiner—Billy S. Taylor
Attorney, Agent, or Firm—Sughrue, Rothwell, Mion, Zinn and Macpeak

[57] ABSTRACT

A fishing reel of the bearing type includes a guide roller for guiding the fishing line. The guide roller is attached to a pair of arms and is swingable with said arms towards and away from the spool. Brake pads located on said arms frictionally engage the spool outer circumference with a force dependent upon the weight of the guide roller and the pulling force on the line. Manual adjusting screw means adjusts the braking force.

1 Claim, 3 Drawing Figures

FISHING REEL BRAKE

BACKGROUND OF THE INVENTION

The present invention relates to a device for preventing a fishing line from being twined around itself (hereinafter referred to as "a fishing line's permanence" preventing device, when applicable) in a dual bearing type fishing reel.

In general, in a fishing reel of this type, the fishing line is pulled out of the reel by hand directly, or by the inertia of the sinker, or by the propulsion of the fishing line. However, in the case where it is necessary to pull out the fishing line at higher speed, or to use a heavier sinker for trolling or for deep fishing, it often happens that when a desired length of the fishing line has been pulled out the spool continues to rotate by the force of inertia. As a result, the fishing line is twined around itself, that is, a so-called "fishing line's permanence" occurs around the spool.

In order to overcome this difficulty the rotation of the spool is controlled by the angler's thumb (thumbing operation), or if the reel is provided with a brake system, the brake system is operated so that the rotation of the spool corresponds to the fishing line pulling speed, thereby to smoothly pull the fishing line out of the reel. However, such operations are troublesome, and moreover it is very difficult to match the braking force of the brake system to the fishing line pulling speed.

SUMMARY OF THE INVENTION

It is an object of the invention to eliminate the above described difficulties. The object is achieved by providing a fishing reel wherein the rotation of the spool is automatically controlled by the inertia of the sinker and the propulsion of the fishing line, and furthermore the control of the braking force applied to the spool is readily achieved in correspondence to the force of inertia and the propulsion which are varied, depending on the size of the sinker, by varying a brake control knot on the side frame plate side of the reel body. Thus, there is provided a novel fishing line's permanence preventing device in a dual bearing type fishing reel which can automatically control the rotation of the spool.

DETAILED DESCRIPTION OF THE INVENTION

Figure 1:
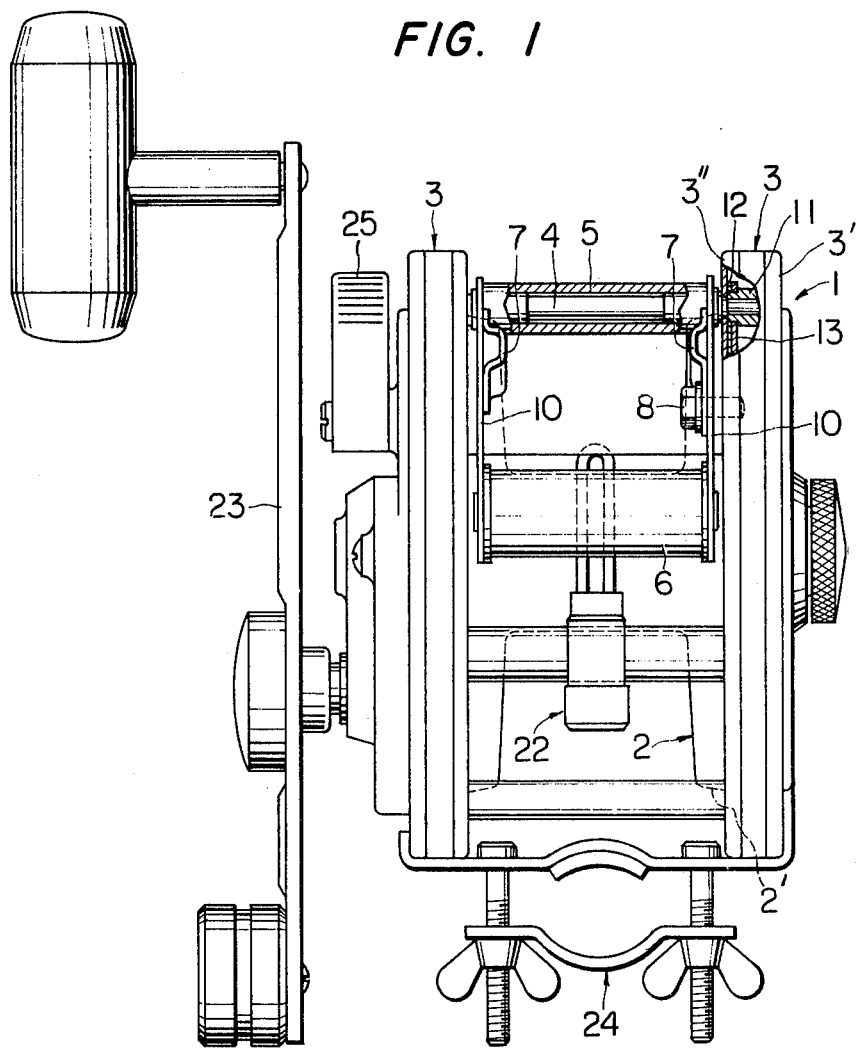
FIG. 1 is a front view with parts cut away illustrating a fishing reel embodying the invention.
Figure 2:
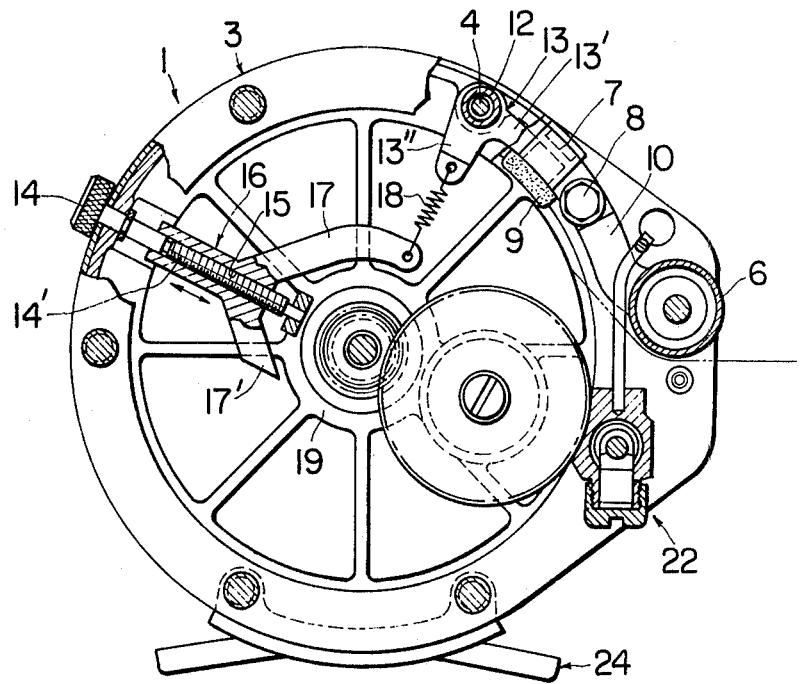
FIG. 2 is a sectional side view showing various parts of the reel shown in FIG. 1.
Figure 3:
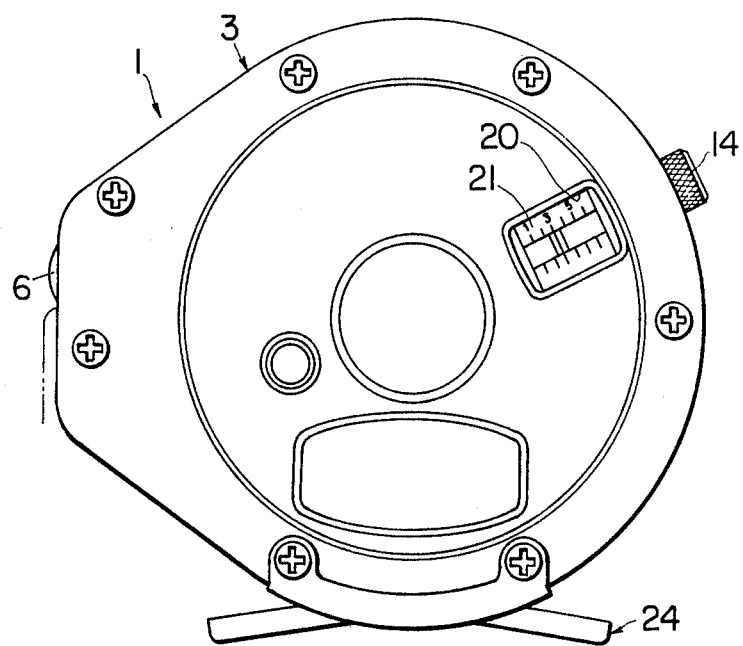
FIG. 3 is a side view showing the reel illustrated in FIG. 1.

As shown in FIGS. 1-3, a spool 2 is rotatably supported by a shaft of a reel body 1, and supporting posts 4 are provided so as to keep a certain distance between two side frame plates 3 of the reel body 1. A pipe-like arm shaft 5 is placed on one of the supporting posts 4 between the two side frame plates 3. Two arms 10 are pivotally mounted on the arm shaft 5 at their bases so that they can swing in the radial direction of the spool 2 around the arm shaft 5. The arms 10 have a line guiding roller 6 rotatably supported by a shaft between the outer end portions of arms 10. A pair of brake shoes 9 are retained by a pocket members 7 at the middle portions of arms 10, respectively.

Each of the side frame plates 3 is a hollow frame plate consisting of an outer frame plate 3' the inside of which is recessed, and an inner frame plate 3" fixed to the outer frame plate 3' by closing an opening provided in the recessed portion of the latter. In each of the side frame plates, there is provided a bushing 11 which penetrates the inner frame plate 3". The above-described supporting post 4 is fixed to the side frame plates by insertion into the bushings 11. The bushing 11 on the right side (as shown in FIG. 1) has a step-like peripheral portion, and swingably supports a control lever 13 through a washer 12. The control lever 13 has two arms 13' and 13". The arm 13' of the control lever 13 is fixed to the arm 10 by means of a screw 8, and therefore can swing together with the arm 10 around the assembly of the above-described arm shaft and supporting post.

All that is necessary for proper operation of the control lever 13 is that it swing together with the arm 10. Therefore the construction of the control lever 13 is not limited to that shown in the figures. That is, the construction of the control lever may be such that another arm shaft 5 penetrates through the inner plate 3", and the control lever is pivotally mounted on this arm shaft inside the side frame plate 3.

Thus, the arm 10 and the control lever 13 can operate as one unit which can swing in the radial direction of the spool 2 around the assembly of the supporting post 4 and the arm shaft 5, and the brake shoe 9 is pressed against the periphery 2' of the spool 2 by a weight applied to the line guiding roller 6 to produce the force of friction therebetween, as a result of which the spool is braked.

In the reel according to this invention, a control screw 14, as shown in FIG. 2, is rotatably provided in the side frame plate 3 by using an "E"-ring so as not to move in its axial direction. The control screw 14 has a threaded portion 14' elongated in the radial direction of the spool. A control piece 16 having a threaded hole 15 is engaged with the threaded portion of the control screw 14 inside the side frame plate.

The control piece 16 has two arms 17 and 17' at its one end. The two arms of the control piece are arranged between the outer frame plate 3' and the inner frame plate 3" so that they are not turned by the rotation of the above-described control screw 14. At least one of the two arms, or the arm 17 in FIG. 2, is longer than the other, and is bent, and furthermore it is coupled through a spring 18 to the arm 13" of the control lever 13.

The innermost end portion of the control screw 14 is rotatably supported by a boss 19 of the side frame plate 3 so as not to move sideways. The outer frame plate 3' of the side frame plate has a window 20 in which a scale plate 21 graduated in the axial direction of the control screw is provided so that the amount of movement of the control piece 16 can be externally observed.

Referring specifically to FIG. 1, there is shown a traverse cam device 22 provided for winding fishing line onto the spool 2, a handle 23, a reel leg 24, and a clutch switching lever 25.

With the fishing reel thus organized, the clutch is disconnected by operating the clutch lever 25 to release the spool 2 and thereby to pull out the fishing line. In this case, the spool is turned by the fishing line which is pulled out of the spool by the inertia of the sinker, or by the propulsion of the fishing line, or by being manually pulled out if necessary. This is the same as in the case of the conventional fishing reel. However, according to this invention, the inertia of the sinker and the propulsion of the fishing line are applied as a force to the line guiding roller, and its arms 10 are therefore swung toward the center of the spool 2 around the arm shaft 5. As a result, the brake shoes 9 provided in the arms abut against the periphery 2' of the spool 2 to brake the latter. In this operation, the control lever 13 is moved together with the arm assembly 10; more specifically, the control lever 13 is swung against the elastic force of the spring 18 connecting the control lever 13 to the control piece 16, as a result of which the elastic force of the spring 18 serves to protect the spool from being applied with an excessive braking force by the brake shoe 9. Accordingly, even in the case where a heavier sinker is used, that is, in the case where the fishing line is pulled out by the increased inertia of the sinker, or by the increased propulsion of the fishing line, or the fishing line is manually pulled out more strongly, the rotation of the spool is suitably controlled.

When the control screw 14 is turned, the control piece 16 slides in the radial direction of the spool through engagement with the threaded portion of the control screw 14. As a result, the control lever 13 can be swung through a desired angle through the arm 17 of the control piece and the spring. In this way, the abutment or frictional force of the brake shoe 9 applied to the spool 2 can be controlled as required. Accordingly, if the control screw 14 is turned in advance so that the brake shoe 9 controls the rotation of the spool to be optimum depending on the weight of a sinker being used, the fishing line can be smoothly pulled out of the reel with no occurence of the fishing line's permanence, although the fishing line is frequently wound on and pulled out during fishing.

As is clear from the above description, in the fishing line's permanence preventing device according to this invention the rotation of the spool is automatically controlled by the innertia of the sinker and the propulsion of the fishing line when the fishing line is pulled out of the reel. That is, the rotation of the spool is controlled in correspondence to the speed of pulling the fishing line out of the reel. Therefore, the occurrence of the fishing line's permanence can be prevented, and in addition the thumbing operation and the braking operation as in the conventional fishing reel can be completely eliminated. Furthermore, in the fishing line's permanence preventing device, the brake control of the spool can be adjusted as desired by operating the control screw in correspondence to the weight of the sinker or to the fishing line pulling speed; and this adjustment can be achieved merely by operating only one control screw provided on the side frame plate. Thus, the practical effect of this invention is significant.

What is claimed is:

1. In a bearing type fishing reel having a reel body with side plates rotatably supporting a spool around which a fishing line is controllably wound and unwound through a traverse cam device, the improvement characterized by, a shaft extending between said side plates and positioned radially outwardly from said spool, a pair of arms pivotally mounted at one end to said shaft, said arms extending substantially along the outer circumference of said spool when in a braking position and rotatable away from the outer circumference of said spool to a non-braking position, a line guide roller rotatably connected between second ends of said arms at a position whereby said line will ride on said guide roller as said line is unwound or rewound, and said guide roller being positioned such that tension on said line provides a rotating force on said arms in the direction of said non-braking position, said arms having brake pads connected thereto at positions closer to said shaft than said roller and on the side of said arms facing said spool to frictionally engage said outer circumference of said spool, the force of said frictional engagement being greater as said arms are rotated towards the circumference of said spool to said braking position, a lever attached to one of said arms and rotatable with said arm about said shaft, said lever being inside one of said side plates and extending radially inwardly, a control screw substantially entirely located within said side plate except for a manually rotatable head portion, a control member threaded onto said control screw for sliding axially thereon upon rotation of said screw, said control member having an arm extending towards said lever, spring means connected between said control member arm and said radially extending lever, said spring means and the weight of said line guide roller providing a biasing force on said arms to rotate said arms to said braking position, whereby the value of said braking force can be manually adjusted by rotating said control screw which causes the physical relationship between said spring means and radially extending lever to be altered.

* * * * *